(12) United States Patent
Waugaman et al.

(10) Patent No.: US 8,951,123 B2
(45) Date of Patent: Feb. 10, 2015

(54) APPARATUS AND METHOD OF MODIFYING AN ONLINE ENVIRONMENT

(75) Inventors: Scott Christopher Waugaman, San Francisco, CA (US); Ronald Jonas Festejo, London (GB); Mitchell Robert Jay Goodwin, London (GB); Mark Anderson, London (GB); Mark Graham Swinhoe, London (GB)

(73) Assignee: Sony Computer Entertainment Europe Limited (GB)

( * ) Notice: Subject to any disclaimer, the term of this patent is extended or adjusted under 35 U.S.C. 154(b) by 1252 days.

(21) Appl. No.: 12/528,920

(22) PCT Filed: Mar. 3, 2008

(86) PCT No.: PCT/GB2008/000714
§ 371 (c)(1),
(2), (4) Date: Aug. 3, 2011

(87) PCT Pub. No.: WO2008/104795
PCT Pub. Date: Sep. 4, 2008

(65) Prior Publication Data
US 2012/0115597 A1    May 10, 2012

(30) Foreign Application Priority Data

Mar. 1, 2007   (GB) .................................. 0703974.6
Oct. 3, 2007   (EP) .................................... 07253928

(51) Int. Cl.
*A63F 13/12*     (2006.01)
*A63F 13/30*     (2014.01)
*A63F 13/00*     (2014.01)

(52) U.S. Cl.
CPC ............... *A63F 13/12* (2013.01); *A63F 13/005* (2013.01); *A63F 2300/407* (2013.01); *A63F 2300/408* (2013.01); *A63F 2300/50* (2013.01); *A63F 2300/534* (2013.01); *A63F 2300/8082* (2013.01)
USPC ............................................. 463/42; 463/31

(58) Field of Classification Search
CPC . A63F 13/12; A63F 2300/65; A63F 2300/66; A63F 2300/807
USPC .......... 463/43, 31, 40–42; 709/203, 212–219, 709/246
See application file for complete search history.

(56) References Cited

U.S. PATENT DOCUMENTS 6,764,402 B2 * 7/2004 Tajiri et al. ...................... 463/43
7,342,587 B2 * 3/2008 Danzig et al. ................. 345/473
(Continued)

FOREIGN PATENT DOCUMENTS

WO       0070557       11/2000

OTHER PUBLICATIONS

International Search Report and Written Opinion dated May 23, 2008 from the corresponding PCT/GB2008/000714.
(Continued)

*Primary Examiner* — Damon Pierce
(74) *Attorney, Agent, or Firm* — Lerner, David, Littenberg, Krumholz & Mentlik, LLP

(57) ABSTRACT

An entertainment device comprises a display generator arranged to generate for display a representation of an on-line virtual environment, that on-line virtual environment being able to host interactions between a user of the entertainment device and other users of one or more remote entertainment devices, a network communications arrangement operable to receive data representative of the actions of the other users within the on-line virtual environment and to receive data indicative of any supplementary data files interoperable with the on-line virtual environment that are associated with one or more remote entertainment devices of one or more of the other users, a data file searcher operable to search the entertainment device for any supplementary data files indicated by the received data, a data file acquisition arrangement operable to acquire, from a networked device, a copy of a supplementary data file indicated by the received data that was not found on the entertainment device, and a data file integrator operable to incorporate relevant elements of the or each supplementary data file into the representation of the on-line virtual environment.

11 Claims, 16 Drawing Sheets

(56) References Cited

U.S. PATENT DOCUMENTS

| | | | |
|---|---|---|---|
| 7,491,124 B2* | 2/2009 | Tanaka et al. | 463/42 |
| 7,639,251 B2* | 12/2009 | Gu et al. | 345/419 |
| 7,867,093 B2* | 1/2011 | Wright | 463/42 |
| 8,052,520 B2* | 11/2011 | Park | 463/25 |
| 2002/0049763 A1* | 4/2002 | Seamon | 707/100 |
| 2003/0008714 A1* | 1/2003 | Tajiri et al. | 463/43 |
| 2004/0259642 A1* | 12/2004 | Tanaka et al. | 463/42 |
| 2004/0266505 A1* | 12/2004 | Keam et al. | 463/1 |
| 2005/0137015 A1* | 6/2005 | Rogers et al. | 463/42 |
| 2005/0182693 A1* | 8/2005 | Alivandi | 705/27 |
| 2005/0251531 A1 | 11/2005 | Jen et al. | |
| 2005/0256985 A1* | 11/2005 | Shea | 710/108 |
| 2007/0155508 A1* | 7/2007 | Sun et al. | 463/42 |
| 2008/0176658 A1* | 7/2008 | Wright | 463/42 |
| 2008/0220876 A1* | 9/2008 | Mehta et al. | 463/42 |

OTHER PUBLICATIONS

Linden Research, Inc.: "Second Life" [Online] 2003, Linden Research, Inc., XP002478210 Retrieved from the Internet: URL:http://en.wikipedia.org/wiki/Second_Life> [retrieved on Apr. 24, 2008]; cited in the application; the whole document.

International Preliminary Report on Patentability (Chapter II of the Patent Cooperation Treaty) dated Jun. 18, 2009 from PCT/GB2008/000714.

Richard A. Bartle: "Designing Virtual Worlds" 2004, New Riders Publishing, XP002478211 ISBN: 0-131-01816-7, p. 3-p. 31.

European Search Report of EP07253928 dated May 23, 2008.

UESPWiki; "Oblivion: Must Have Mods", Retrieved from the Internet: http://www.uesp.net/wiki/Oblivion: Must_Have_Mods [retrieved on Aug. 22, 2007]; cited in the application; pp. 1-6.

Xilver; Midas Magic—Spells of Aurum—Planet Elder Scrolls; "Oblivion Mods, Midas Magic—Spells of Aurum"; Retrieved from the Internet: http://planetelderscrolls.gamespy.com/View.php?view=OblivionMods.Detail&id=2502 [retrieved on Aug. 22, 2007]; cited in the application; pp. 1-8.

Elderscrolls Oblivion—ReMOSitory; Retrieved from the Internet: http://www.elderscrolls-oblivion.com/index.php?option=com_remository&Itemid=16%2 . . . [retrieved on Aug. 22, 2007]; cited in the application; pp. 1-10.

European Office Action Application No. EP 07253298 dated Feb. 10, 2012.

* cited by examiner

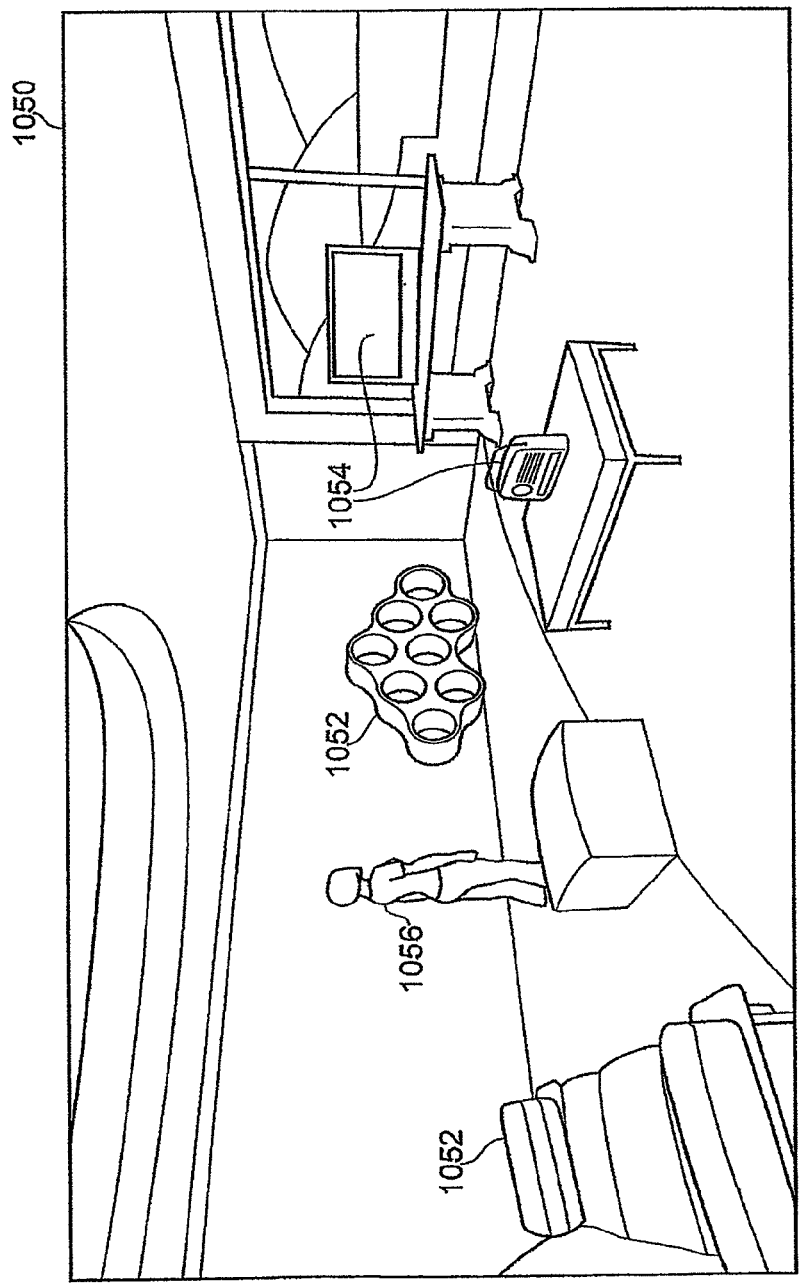

APPARATUS AND METHOD OF MODIFYING AN ONLINE ENVIRONMENT

The present invention relates to an apparatus and method of modifying an online environment.

In conventional video games, a so-called 'game engine' controls core gameplay, maintains in-game parameters, computes character and object behaviour (through scripted animation and/or physics simulation) and co-ordinates the loading and rendering of game models and textures by a graphics processor. To perform these functions, the game is installed on the host computer with the necessary game assets to properly play the game. These include physical models (e.g. 3D meshes, physics parameters and textures) for landscapes, objects and characters in the game, behaviour models such as movement path guides and personality parameters for non-player characters, and functional models such as the abilities of an object, and which if any animations or graphical sub-routines are associated with these abilities (for example, sound files and graphical effects unique to a magical sword).

In addition, many games provide users with a development kit (often a consumer version of the editing tool used to author the original game), and with such kits users create so-called 'mods'. Mods are supplementary data files that may range from so-called 'total conversions', in which users create and supply an entirely new set of game assets, effectively creating a new game using the original game engine, through to simpler modifications or enhancements to the existing game, such as new locations, characters, magic spells or objects. These mods can often be downloaded and installed as an unofficial expansion or modification of the game. Some games come with mod management tools in order to make it easier to install or uninstall mods, although saved games that incorporate modified features can suffer from subsequent compatibility issues if the relevant mod is uninstalled. Thus mods that enhance features of an existing game tend to become permanent features of the game in use.

Examples of such mods for the game 'Oblivion' can be found at http://www.uesp.net/wiki/Oblivion:Must_Have_Mods, http://planetelderscrolls.gamespy.com/View.php?view=OblivionMods.Detail&id=2502, and http://www.elderscrolls-oblivion.com/index.php?option=com_remository&Itemid=16&func=fileinfo&id=426.

Further issues arise when mods are implemented for on-line games. Traditionally, the server hosting the on-line game requires all client devices connecting to it to download any modifications that have been applied to the game server, so that they all can play using the same assets and rules and communicate with the server properly. Consequently on-line game mods tend to be developed by server hosts rather than clients, and/or are applied automatically via the server when the client connects. Typical mods of this type are simple audio/texture mods to personalise an on-line environment to the tastes of the server host (such as the hosts logo), or $3^{rd}$ party client/server systems such as Punkbuster (http://en.wikipedia.org/wiki/PunkBuster), which detects attempts by clients to cheat and is a mandatory requirement of some online game servers.

Some attempts to lift these limitations can be found in persistent virtual worlds such as Second Life, where users can be given rights to create content on the Second Life server, thereby effectively adding to the central, and default, copy of the environment.

Nevertheless, there is scope to improve upon the provision and management of user modifications in an on-line environment.

In a first aspect of the present invention, an entertainment device, comprises a display generator arranged to generate for display a representation of an on-line virtual environment, that on-line virtual environment being able to host interactions between a user of the entertainment device and other users of one or more remote entertainment devices, a network communications arrangement operable to receive data representative of the actions of the other users within the on-line virtual environment and to receive data indicative of any supplementary data files interoperable with the on-line virtual environment that are associated with one or more remote entertainment devices of one or more of the other users, a data file searcher operable to search the entertainment device for any supplementary data files indicated by the received data, a data file acquisition arrangement operable to acquire, from a networked device, . . . a copy of a supplementary data file indicated by the received data that was not found on the entertainment device, and a data file integrator operable to incorporate relevant elements of the or each supplementary data file into the representation of the on-line virtual environment.

In another aspect of the present invention, a server arranged to administer an on-line virtual environment comprises a network communications arrangement operable to receive data representative of the actions of each user within the on-line virtual environment and to transmit data representative of the actions of each other user to each user within the on-line virtual environment, the network communications arrangement being operable to receive data indicative of the use of a supplementary data file interoperable with the online virtual environment and associated with one or more users, data file acquisition means operable to obtain an indicated supplementary data file, and in which the network communications arrangement is operable to transmit corresponding supplementary data files to one or more users other than the or each user with which the obtained supplementary data files are associated.

Advantageously, therefore, user-originated mods can be flexibly introduced into an on-line virtual environment as users of the mods connect and disconnect from the environment Moreover, by obtaining copies of encountered mods, each entertainment device accumulates a local cache of common mods, thereby reducing average download traffic over time.

Further respective aspects and features of the invention are defined in the appended claims.

Embodiments of the present invention will now be described by way of example with reference to the accompanying drawings, in which:

FIG. 8a is schematic diagram of an apartment zone in accordance with an embodiment of the present invention;

An apparatus and method of modifying an on-line environment are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example embodiment of the present invention, an on-line virtual environment is hosted by a server, to which a plurality of entertainment devices are connected. Each entertainment device renders a viewpoint of the virtual environment for its user, comprising avatars representative of the other users within the environment. The environment comprises objects and facilities whose underlying code is common to all the entertainment devices, such as for example a pool table that any user can play on. In addition, however, any user may have one or more additional mods on their system that gives them additional facilities. Where these mods affect the representation of the environment, or allow interaction with other users, each other PS3 within the virtual environment searches its own data for a corresponding mod to enable it to represent the mod-enabled entertainment device and, if it cannot be found, accesses the mod via the hosting server or directly from the mod-enabled entertainment device via a peer-to-peer connection. In this way useful objects, such as a camera, can be used by a user whilst other entertainment devices can represent the object and associated behaviours, such as a flash graphical effect and a shutter noise. Similarly, interactive objects notionally owned by one user, such as a Frisbee or a bat and ball, can be played with amongst a plurality of users that notionally don't own a Frisbee or bat and ball themselves.

In an embodiment of the present invention, the entertainment devices are Sony® Playstation 3 (PS3®) entertainment devices.

Figure 1:
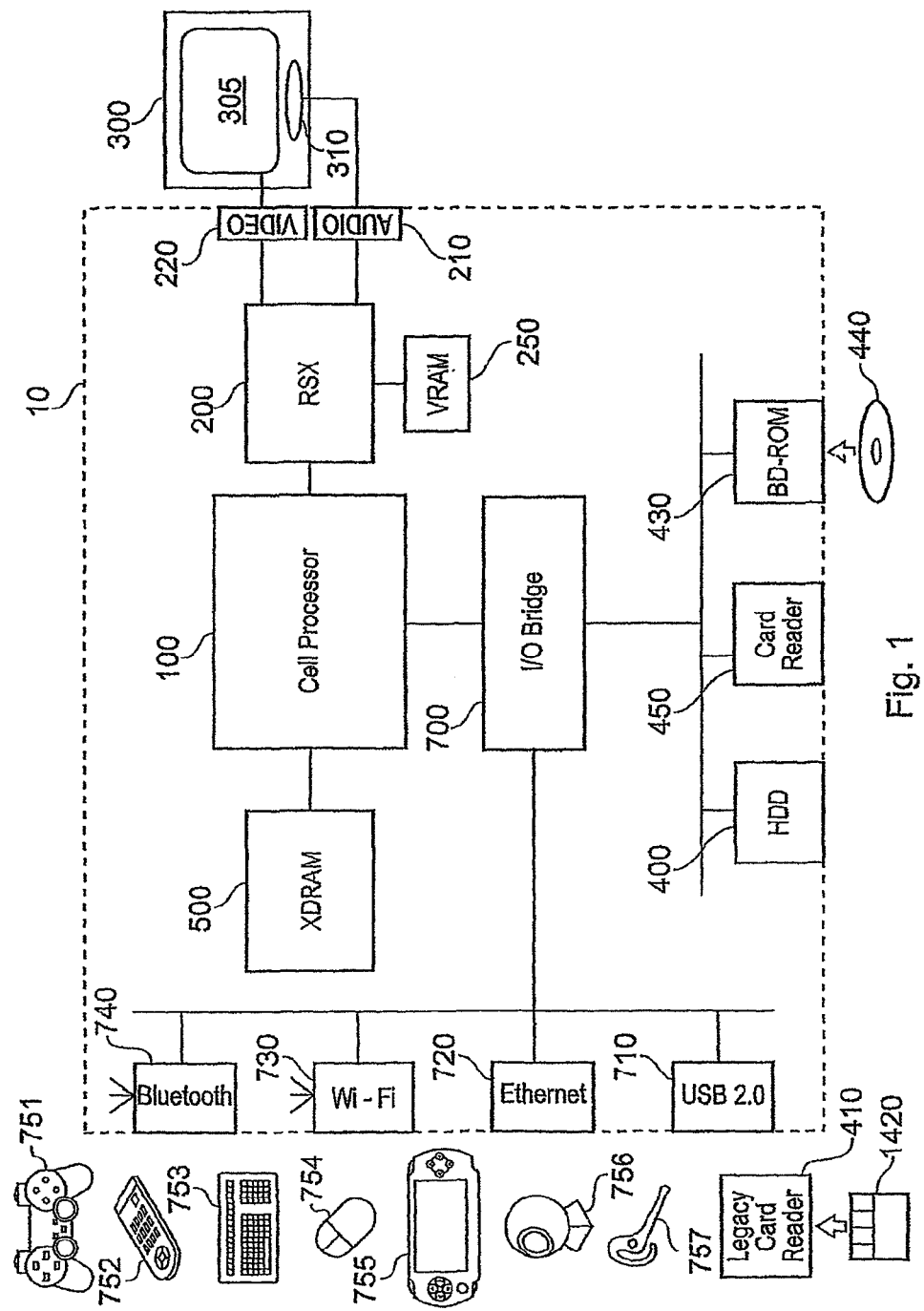
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
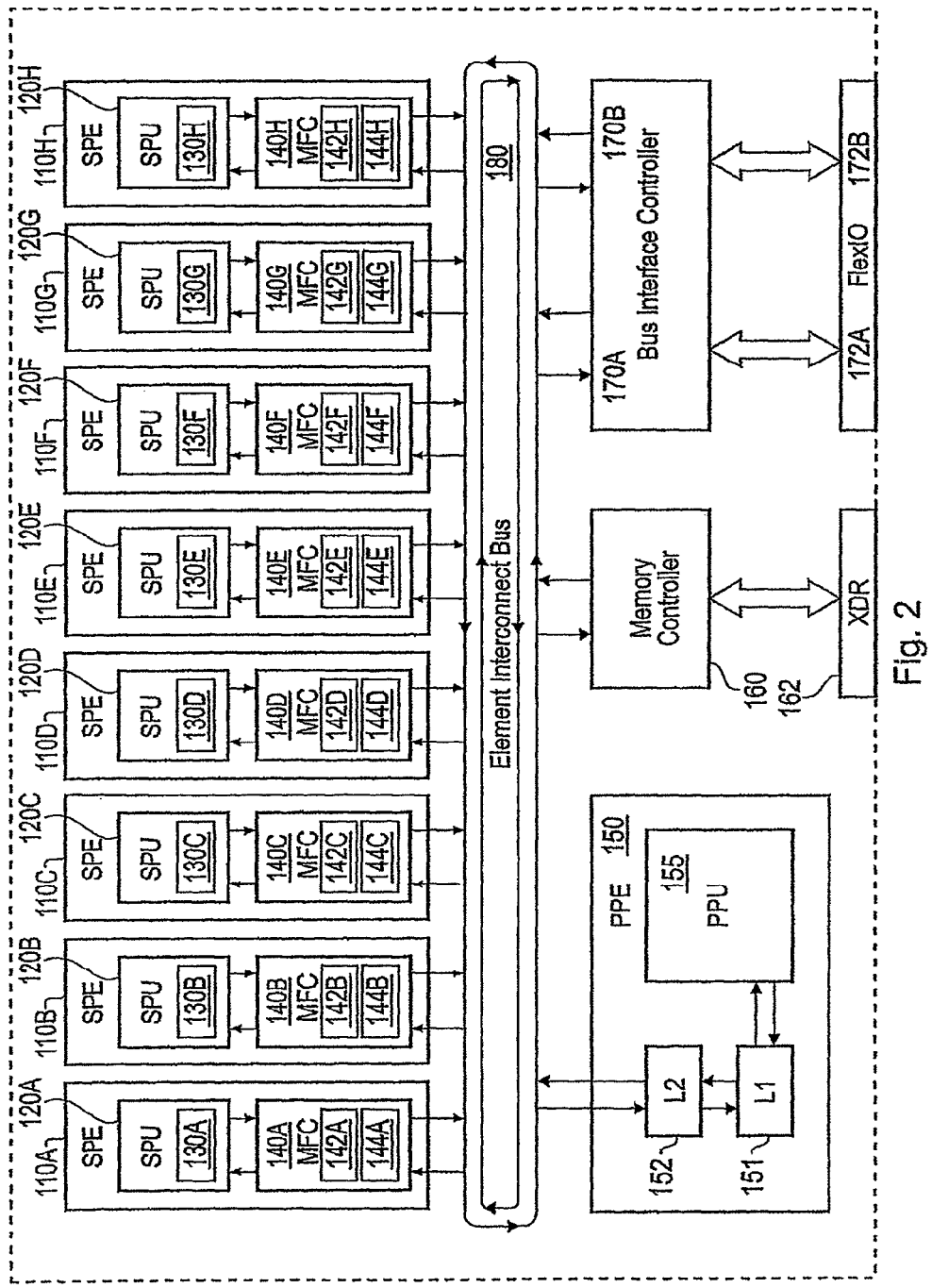
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing. Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (MB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
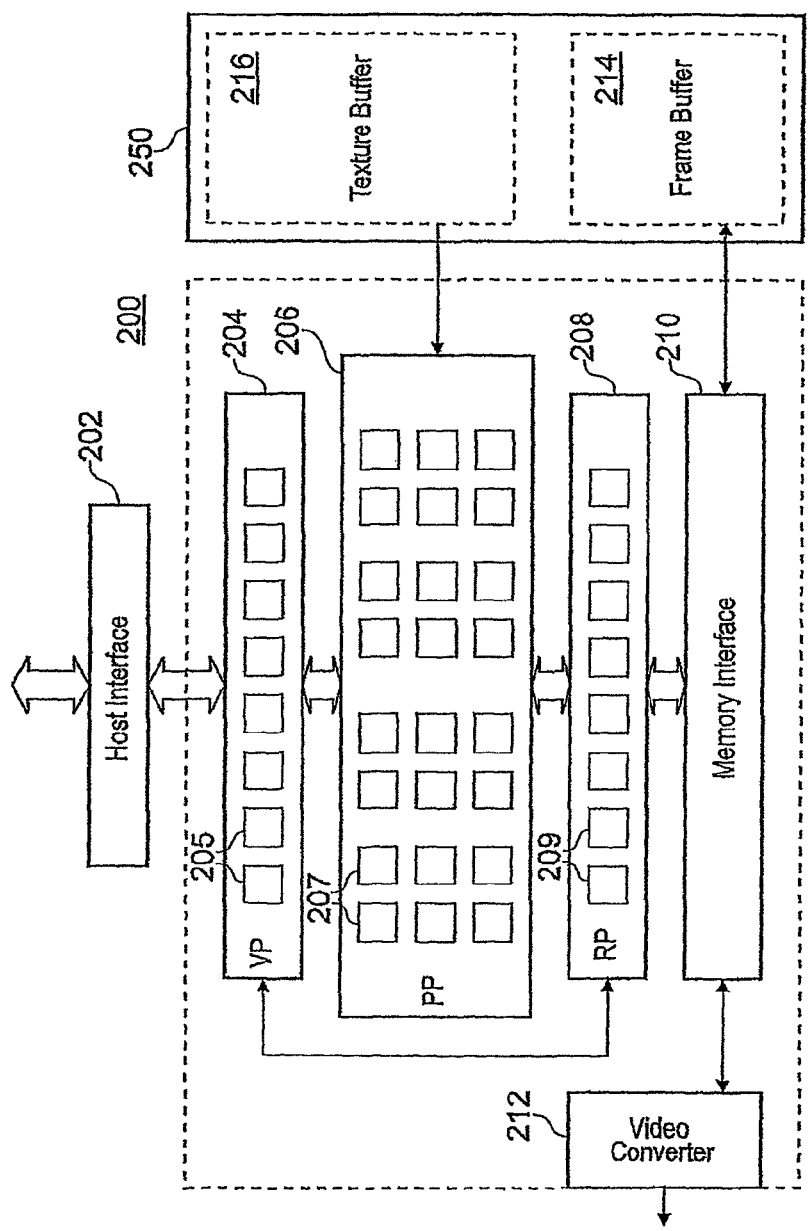
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
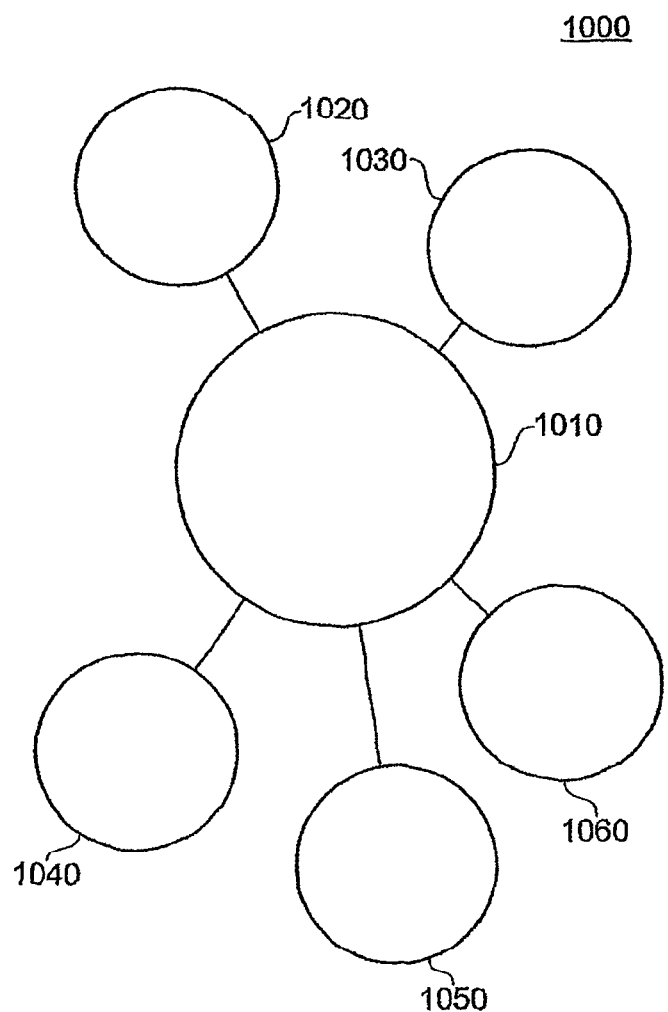
FIG. 4 is a schematic diagram of an interconnected set of game zones in accordance with an embodiment of the present invention.
Figure 5:
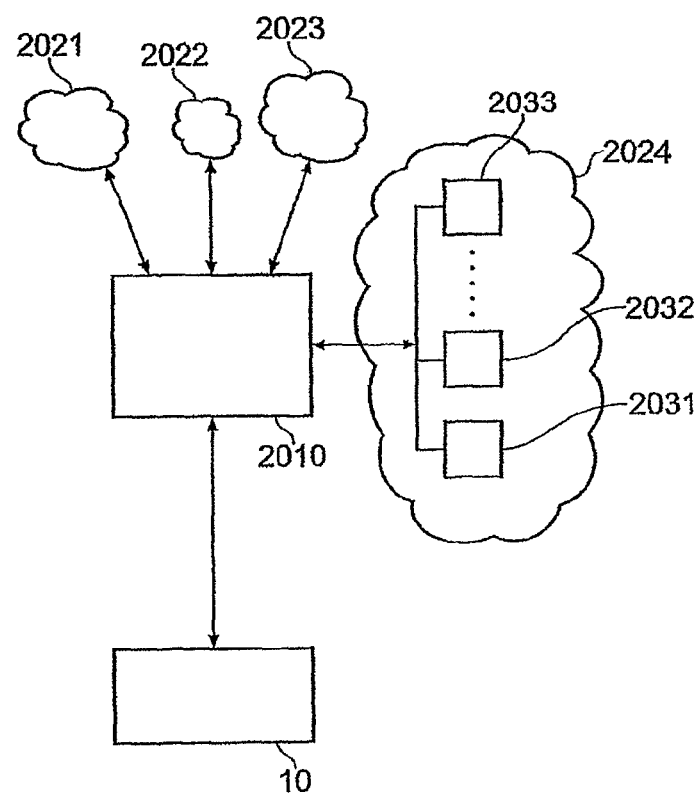
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Figure 6A:
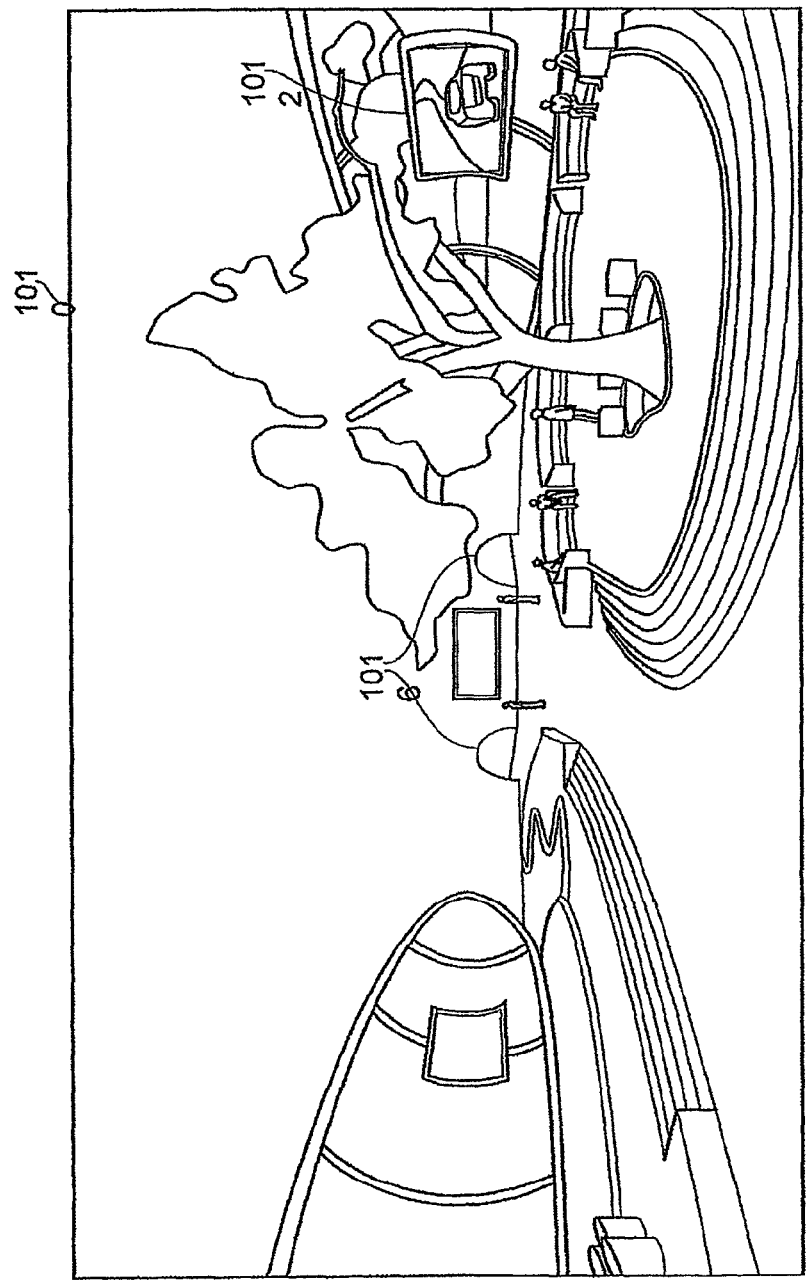
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
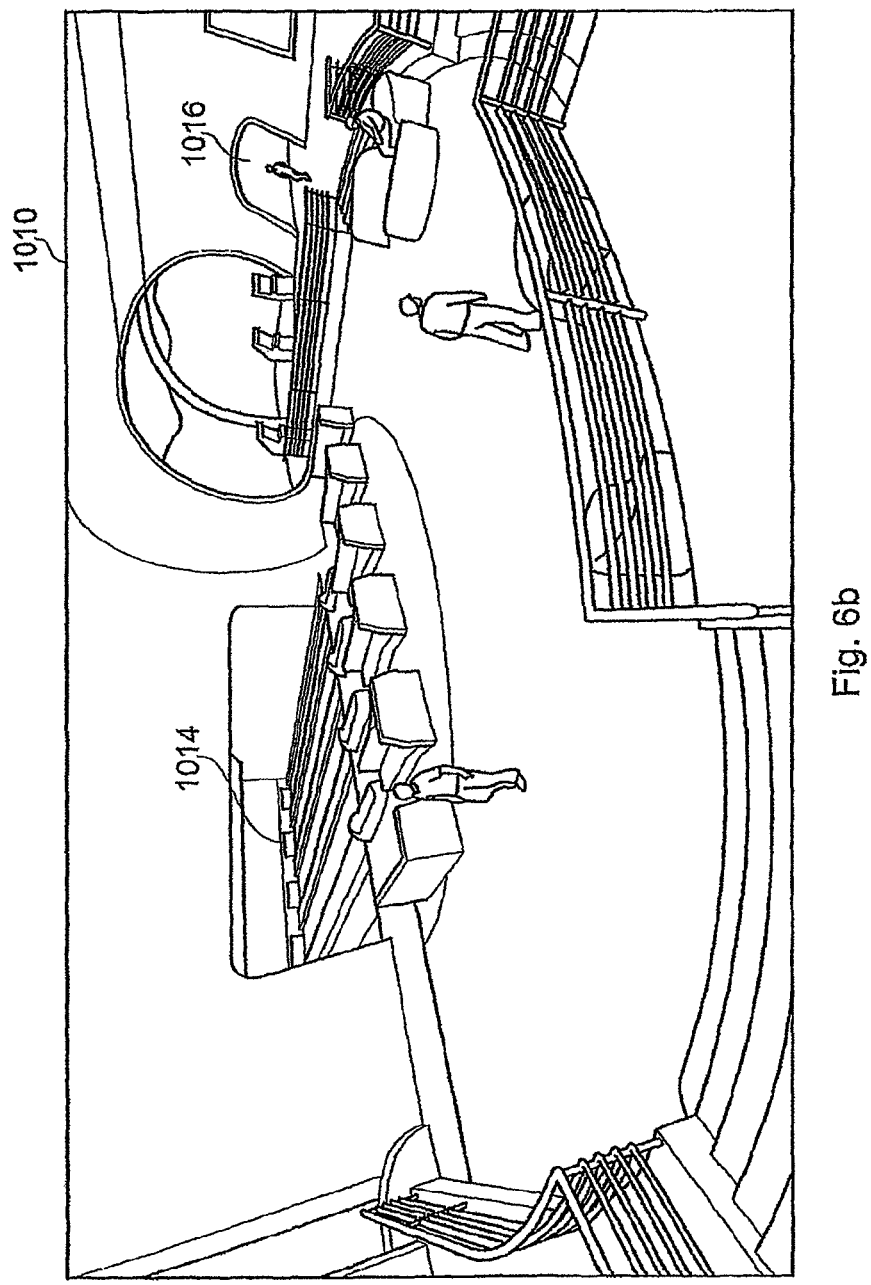
FIG. 6b is a schematic diagram of a lobby zone in accordance with an embodiment of the present invention.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
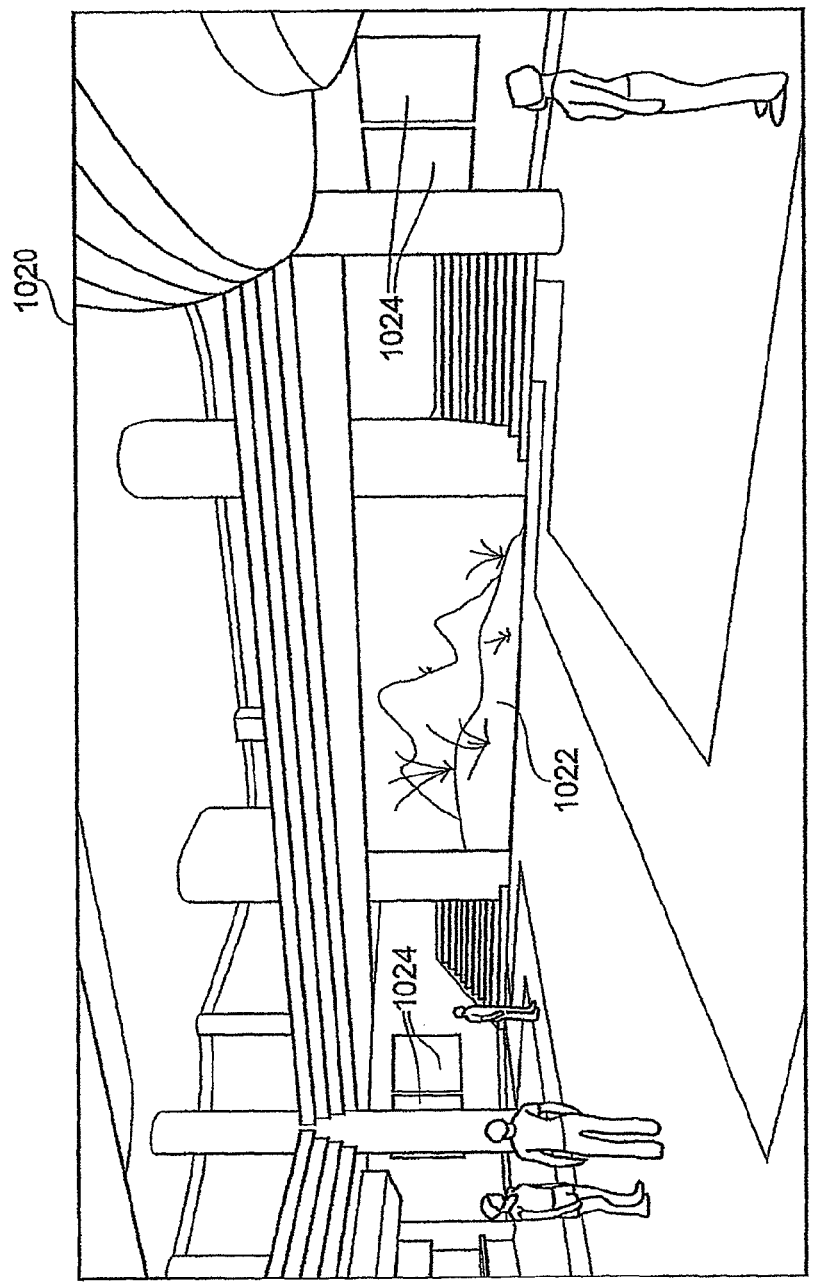
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
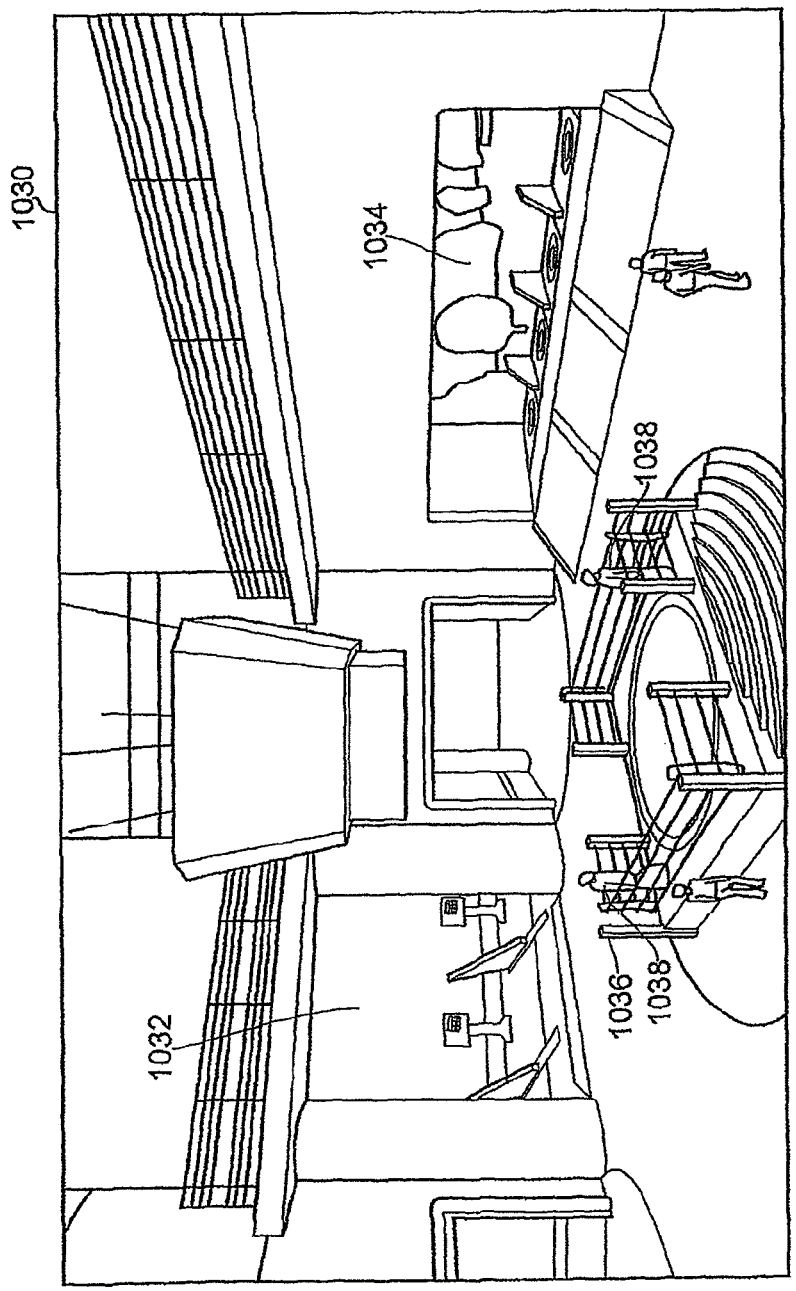
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;

ii. Changes in avatar appearance, behaviour and/or communication options within the zone;

iii. The provision of one or more games, such as basketball 1032 or a golf range 1034, optionally branded or graphically reminiscent of the developer's or publisher's games;

iv. One or more interactive scenes or vignettes representative of the developer's or publisher's games, enabling the player to experience an aspect of the game, hone a specific skill of the game, or familiarise themselves with the controls of a game;

v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an application program interface (API), to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
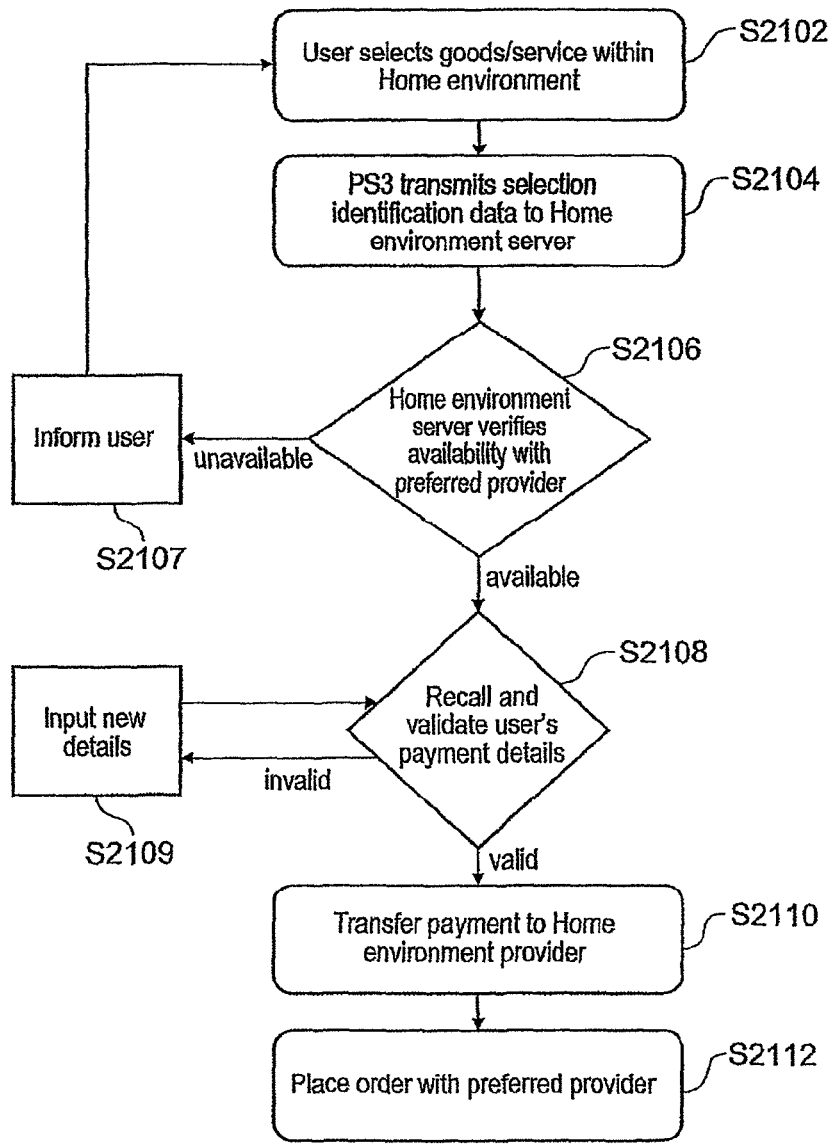
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third party payment provider a transfer of payment from the user's account.

Finally, in s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Referring to FIG. 8a, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to interne radio streams. In addition, user artwork or photos may be imported into the room in the form of wall hangings and pictures.

Optionally, the user (represented in FIG. 8a by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Figure 8B:
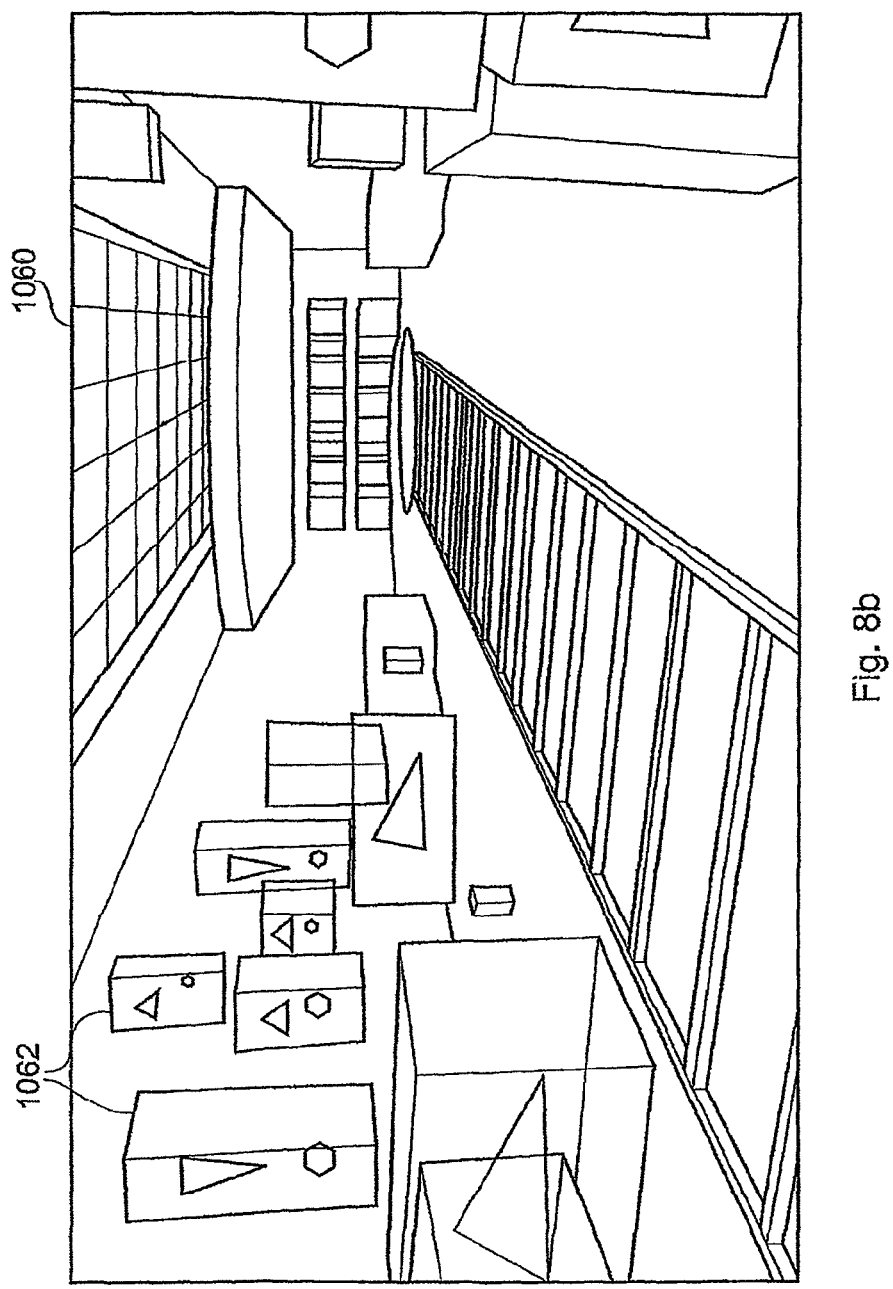
FIG. 8b is schematic diagram of a trophy room zone in accordance with an embodiment of the present invention.

Referring to FIG. 8b, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying a relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best gainers within a geographical, age specific or game specific group, or even worldwide. Alternatively or in addition, a leader board of the best scoring gainers can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
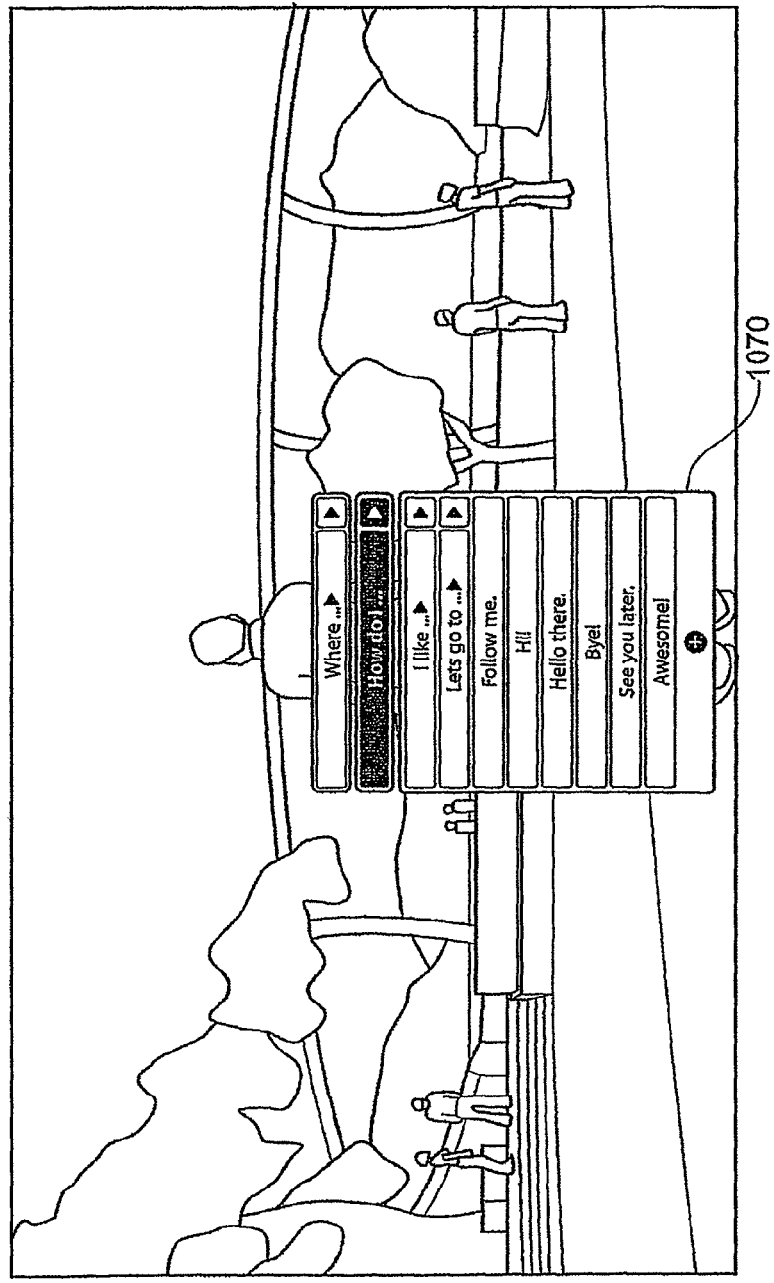
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech to option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the preset area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony Eye Toy video camera can use a video chat mode, for example via a pop-up screen, or via a TV or similar device within the Home environment, such as a Sony® Playstation Portable (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate online Home environments. Likewise, there may be many separate Home environment servers, for example in different countries.

Once assigned to a Home environment, a PS3 initially, uploads information regarding the appearance of the avatar, and then in an ongoing fashion provides the Home environment server with positional data for its own avatar, and receives from the Home environment server the positional data of the other avatars within that online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement. In addition the IP addresses of the other PS3s 2031, 2032, 2033 within that Home environment 2024 is shared so that they can transmit other data such as speech in a peer-to-peer fashion between themselves, thereby reducing the required bandwidth of data handled by the Home environment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
 ii. The user's preferred language;
 iii. The user's age;
 iv. Whether any users within the current user's 'Mends list' are in a particular Home environment already;
 v. What game disk is currently within the user's PS3;
 vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a pre-dominant number of other users also currently have the same game mounted, thereby facilitating the organisation of multiplayer games. In this latter case, the PS3 10 detects the game loaded within the BD-ROM 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is on-line. The user may then broadcast an invite to their friends, either using a peer-to-peer connection or, if the friend is within a Home environment or the IP address is unknown, via the Home environment server. The Mend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
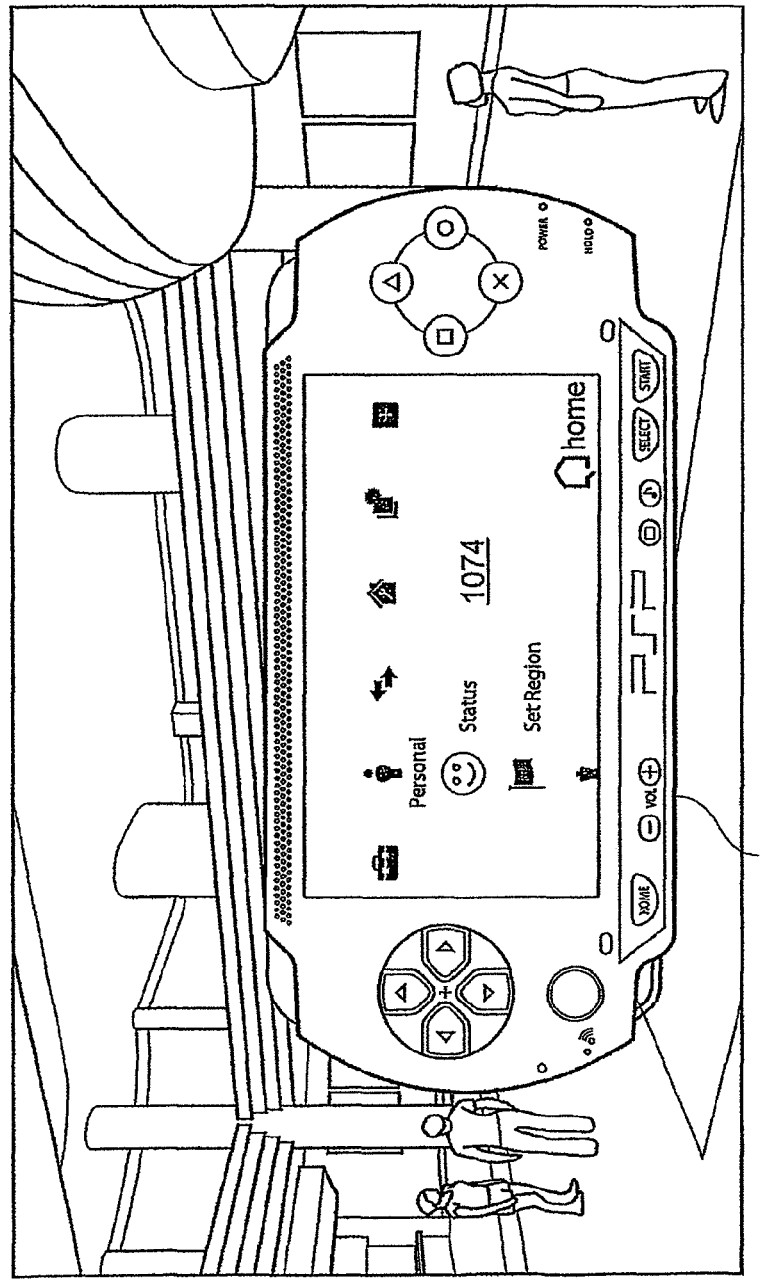
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony Playstation Portable (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual P'SP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Figure 11:
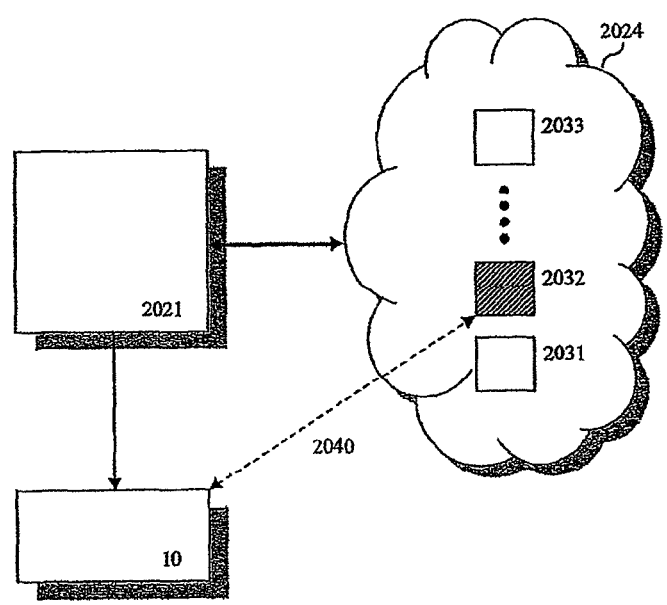
FIG. 11 is a schematic diagram of a Home environment online client/server arrangement in accordance with an embodiment of the present invention.

Referring now to FIG. 11, in an embodiment of the present invention an on-line system comprises the PS3 10 coupled to the Home environment server 2010, along with a plurality of other users' PS3s 2031, 2032, 2033 who together all share an instance of the Home environment 2024. In the example of FIG. 11, however, one of those other users has installed a modification to the Home environment on their PS3 2032.

Such a modification will typically comprise one or more of the following:
 i. one or more graphics models (e.g. a mesh);
 ii. one or more graphics textures; and
 iii. one or more instruction scripts readable by the Home environment engine running on the PS3.

As noted previously, the Home environment engine comprises an API for developers, etc., to integrate their own content when designing new zones. The script parsing system and/or code plug-in system of this API thus also enables the implementation of commands written in or referred to by mod scripts. Such script parsing and plug-in systems are well known in the art for to standard mods.

For example, one possible mod would provide a suite of 'superpowers' for the user, and simply comprise a script or scripts that allow the user to sprint more quickly whilst using the existing running animation by changing position update rates, or which allow the user to fly, by for example temporarily setting the user's avatar to have zero mass when jumping, or by accessing a development function such as the so-called 'noclip' function (noclip is typically used to inspect a virtual environment from any angle, or to avoid a game character being trapped by an error in the landscape, and enables free roaming of the environment). A similar superpower achieved by accessing a common development function is the so-called 'God' mode, which typically combines the features of 'noclip' with invulnerability).

Such a modification would not affect the representation of the Home environment on the PS3s of the other users, since the data describing the position of the avatar of the user implementing the mod would be relayed to these other users in the normal manner, as described previously.

By contrast, other modifications to one PS3 2032 could require the other PS3s 10, 2031, 2033 to also integrate a modification in order to represent or interact with such mods within the Home environment.

One example is a 'camera' mod. Such a mod may comprise resources such as a mesh and texture graphically defining the camera object, an audio sample and 'flash' graphics script to create a shutter sound and flash effect on command, and an instruction script specifying animation commands to make an avatar appear to take a photo as well as commands to take a screen shot and store it on the PS3.

In this case, the user who has the mod installed on their PS3 and hence effectively 'owns' the camera within the Home environment can take screenshots from their PS3, thereby storing image captures of the environment on the PS3 for later viewing. Preferably however, so that other users can see what the user with the camera is doing (and whether they are the subject of a photograph) it would be useful for these other users to also integrate the camera object, flash and shutter effects and avatar animations within their own respective implementations of the Home environment so that they can see users who own cameras taking photos with their camera.

The camera is thus an example of a mod where other PS3s integrate aspects of the mod into their respective renditions of the Home environment simply in order to correctly represent use of that mod by a third party. However, other mods can be more interactive.

For example, another mod is a Frisbee® toy. Such a mod may again comprise resources such as a mesh and texture defining the Frisbee object, an instruction script specifying animation commands to make an avatar appear to throw or catch a Frisbee and a script specifying physics parameters that determine the Frisbee's behaviour when thrown.

In this case, it will be beneficial to the owner of the Frisbee mod if other users can acquire and use the complete mod with all of its resources, so that all the parties involved can see, catch and throw the Frisbee.

Thus a single Frisbee in the Home environment can result in fully functioning copies of the Frisbee mod being incorporated into the representations of the Home environment implemented by the other PS3s linked to that instance of the Home environment. However, this does not necessarily mean that the users of these PS3s now necessarily have their own Frisbee.

Mods (in this example, the Frisbee mod) comprise ownership (usage) data specifying that users who do not own the Frisbee mod, but only have a copy for viewing and interaction purposes, can only use it under certain conditions. For example, a copy of the Frisbee mod may only be useable to interact with a Frisbee already existing within the Home environment (i.e. a user who is not the owner of a Frisbee cannot summon a Frisbee when they want)—this would limit them to playing with someone else's Frisbee when that person is logged into the Home environment and have released the Frisbee they own into that environment themselves. Alternatively, a user who is not the owner of a Frisbee may only be able to fully use the Frisbee mod themselves for a certain period of time, or for a certain number of sessions in the Home environment. Moreover, the ownership data can prevent such a temporary user of the mod from passing it on to anyone else.

This provides a means to restrict access to certain mods, thereby enabling a market for earning mods within the virtual environment or purchasing them from a retailer, and also limits the creation of self-propagating mods that could run rampant within a virtual environment.

Other encoded restrictions on the usage of a mod can be provided, including the age of the user, the value of status, level or class parameters relating to the user's avatar within the on-line environment, the associated use (or non-use) of another mod at the same time, the country or language used, and the version number of the on-line environment, if different servers running different patched versions or releases of the environment exist.

The above mods are representative of three categories:
 i. The superpowers mod represents 'transparent' mods that do not require any $3^{rd}$ party modification;
 ii. The camera mod represents 'asymmetric' mods, where $3^{rd}$ parties do not necessarily need all the mod's resources in order to represent it.
 iii. The Frisbee mod represents 'symmetric' mods, requiring each party to have equal resources, if not equal ownership.

It will be clear that other mods may fall between these basic categories; for example, a bat and ball may be arranged so that only the user can hold the bat, whilst a third party can throw the ball; in this case both the user and the third party each have symmetric resources in order to represent the other, but the usage, as defined in the scripts or ownership details, makes the mod function asymmetrically.

The symmetry or otherwise of the mod can also be implemented in several ways; in an embodiment of the present invention, different scripts are provided for identified owners and third parties to use. Alternatively or in addition, each asset in the mod is tagged to identify who can use it. Alternatively these tags can take the form of a configuration file listing which assets are used in which circumstances, optionally as part of the ownership data. For example:

| Bat-and-Ball Mod | Owner | Non-owner |
|---|---|---|
| Bat & Ball Meshes | ✓ | ✓ |
| Bat & Ball Textures | ✓ | ✓ |
| Impact & Landing Sounds | ✓ | ✓ |
| Strike & Catch Animations | ✓ | ✓ |
| Authorisation to use ball | ✓ | ✓ |
| Authorisation to use bat | ✓ | x |

| Camera Mod | Owner | Non-owner |
|---|---|---|
| Camera meshes | ✓ | ✓ |
| Camera textures | ✓ | ✓ |
| Camera sound | ✓ | ✓ |
| Camera flash graphics effect | ✓ | ✓ |
| Camera snapshot animation | ✓ | ✓ |
| Use screen capture plug-in | ✓ | x |

In the first table, the resources needed to implement the bat & ball game (meshes, textures, sounds and avatar animation) are all shared. However, the usage as defined by the scripts or ownership details is asymmetric, conferring use of the bat to only the owner.

In the second table, the resources needed to represent the camera are all shared. However, usage of the plug-in that implements the camera function is not permitted for non-owners. In an embodiment of the present invention, alternatively such tagged elements are not transmitted to non-owners and so the non-owner would not have a copy of the screen capture plug-in code. However this is not preferred as it makes it more cumbersome to upgrade to a functioning version of the mod if a non-owner wishes for example to purchase it—upgrading is simpler by just unlocking a complete mod than re-acquiring or completing the elements of a partial mod.

Returning to FIG. 11, in the illustrated example the PS3 2032 is running a mod that requires either symmetric or asymmetric use of the mod by other PS3s in order to properly represent it. Consequently they need full or partial copies of the mod in order to represent it properly.

In an embodiment of the present invention, the other PS3s are informed that a PS3 running a particular mod has joined the Home environment (conversely, a PS3 joining the Home environment is told which mods are already in use in that Environment).

This can be done in several ways. A PS3 running a mod can inform all other PS3s in that instance of the Home environment that it is using the mod via a peer to peer connection, based on FP addresses distributed by the Home environment server.

Alternatively and preferably, a PS3 running a mod can inform the Home environment server it is using a mod; the Home environment server can then inform other PS3s linked to that instance of the Home environment. This has the advantage that the Home environment server already keeps a constant update on the connection of different PS3s to the environment and so can disseminate mod usage information flexibly without needing additional data traffic such as up to date peer-to-peer address lists. This approach also enables the inclusion of filtering to exclude mods (for example by an age criterion or by total number of mods running in an instance of the Home environment) and the blacklisting of abusers (e.g. people who have authored offensive mods, or mods designed to harm the system, e.g. comprising large amounts of junk data). Optionally, it also allows the Home environment server to spawn a connecting PS3 into an instance of the Home environment where people are already using the mod, thereby avoiding any further downloads of the mod for other users.

When a PS3 receives information that another PS3 in the same instance of the Home environment is using a particular mod, it first searches its memory, register or similar to determine if it is already running the mod, in which case no further action need be taken.

If it is not running the mod, then it searches its local hard drive or drives for the relevant mod data file; if the file is in the hard drive, then it can be incorporated into the current session of the Home environment so that the user can interact with other users of the mod as outlined previously. In an embodiment of the present invention, this is achieved by loading the mod assets into memory as a background operation, and then adding the mod name to the script/plugin parser of the Home environment engine. This can then parse the ownership details and scripts to determine which aspects of the Home environment to augment, replace, integrate or otherwise modify within its representation of the Home environment.

If the mod is not on the hard drive, then the PS3 acquires the data file from the Home environment server, for example by transmitting a request to the Home environment server and receiving a copy in response. The Home environment server maintains an archive of all encountered (or officially approved) mods, from which it can transfer the file to the PS3 in. response to the request. The PS3 then stores it on its local hard drive. Alternatively, the PS3 can obtain the data file from the PS3 that announced the use of the mod in the first place, via a peer to peer connection 2040. Similarly if the Home environment server has never encountered a mod before, it can upload it from the relevant PS3, and either disseminate it, scan it for viruses first, or submit it for quality assurance testing by a tester.

Whether obtained from active memory, local hard disk, server or another PS3, the ownership details will determine what aspects or modes of the mod are available to the PS3. The ownership details will indicate whether the recipient of a file should be an owner or not, and optionally whether a current owner can confer ownership to someone else when transmitting the file (e.g. via peer-to-peer). An owner can be identified by a flag in the ownership details, and may or may not be set in any copy sent to other users, thereby conferring or denying ownership. It will be appreciated that more complex indications of ownership (e.g. public/private keys) may be used to prevent unauthorised ownership. Optionally the Home environment server can set appropriate ownership details when distributing a mod as described above.

Over time, commonly encountered mods will accumulate in the hard disk of each PS3. Thus each PS3 effectively operates a caching model, where the full repository of mods is stored on the server, whilst frequently encountered mods become cached on the hard drive for convenience and speed of access.

Such a cache can employ an expiry system, so that unused mods are deleted after a certain time period, and/or the cache may occupy limited space on the hard drive, so that when the cache reaches a threshold size, the least used or longest unused mod is deleted when a new mod is encountered and required.

This approach enables a very large number of user-created and user-selected mods to be flexibly and transparently integrated within an online environment.

Mods may be created by users, third party publishers or by the creator of the virtual environment itself. A user of a PS3 may acquire a mod by purchasing it, either within the virtual environment or via some other on-line purchasing system, by earning it as part of a reward scheme or quest within the on-line virtual environment, or by being given the mod by the creator, either for a limited period (as set in the ownership details) or permanently.

A mod that is owned by a user is cached on their PS3 but is not subject to deletion in the course of normal cache management as outlined above. However, if an owned mod is not used for a long period of time, optionally the user can be asked by the PS3 whether they wish to delete it.

Figure 12:
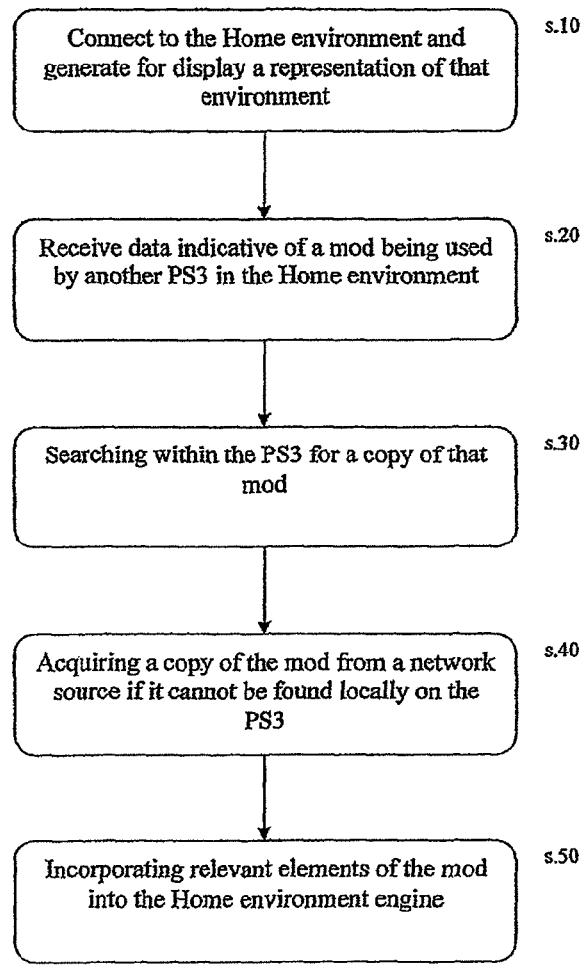
FIG. 12 is a flow chart of a method of on-line modification in accordance with an embodiment of the present invention.

Referring now to FIG. 12, a method of modifying an on-line environment comprises:

in a first step, a PS3 connecting (s.10) to the Home environment, and generating for display a representation of that environment;

in a second step, the PS3 receiving (s.20) data indicative of a mod being used by another PS3 in the Home environment;

in a third step, searching (s.30) within the (firstmentioned) PS3 for a copy of that mod;

in a fourth step, if the mod cannot be found in the local cache, acquiring (s.40) a copy from a networked device—e.g. from the server or the originating PS3—i.e. the other PS3 that is using the mod or from another PS3 which may not be currently using the mod but which holds a copy and is available to transfer a copy to the firstmentioned PS3 by a peer-to-peer transfer; and in a fifth step, incorporating (s.50) relevant elements of the mod into the Home environment engine held at the firstmentioned PS3, thereby updating the representation of the Home environment seen by the user of the firstmentioned PS3 to incorporate the effects of the other PS3's mod.

It will be apparent to a person skilled in the art that variations in the above method corresponding to operation of the various embodiments of the apparatus disclosed herein are considered within the scope of the present invention, including but not limited to:

stipulating which elements of the mod may be used by the entertainment device according to ownership conditions;

the mod comprising distinct scripts or other assets for different classes of users (such as owners, observers, participants etc);

the use of the mod being limited by time, number of on-line sessions, presence of the owner or other conditions such as the use of another mod in conjunction with it or the age of the user;

accessing information about mods or mods themselves using a peer-to-peer connection; and managing the locally cached mods.

It will be appreciated that in embodiments of the present invention, the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. An entertainment device, comprising:
a display generator arranged to generate for display a representation of an on-line virtual environment, that on-line virtual environment being able to host interactions between an avatar of a user of the entertainment device and avatars of other users of one or more remote entertainment devices, the entertainment device and the one or more remote entertainment devices holding in common code to represent the on-line virtual environment;
a network communications arrangement operable to receive data representative of the interactions of the other users within the on-line virtual environment, and operable to receive data indicative of any supplementary data files comprising a modification to be applied to the displayed on-line virtual environment, to represent the avatar of one or more remote entertainment devices of users who join the on-line virtual environment, said supplementary data files comprising one or more graphics textures;
a data file searcher operable to search the entertainment device for any supplementary data files indicated by the received data;
a data file acquisition arrangement operable to acquire, from a networked device, a copy of a supplementary data file indicated by the received data that was not found on the entertainment device; and
a data file integrator operable to incorporate relevant elements of the or each supplementary data file into the representation of the on-line virtual environment.

2. An entertainment device according to claim 1, in which a supplementary data file comprises one or more selected from a list consisting of:
  i. one or more graphics models;
  ii. one or more instruction scripts readable by the display generator; and
  iii. usage conditions.

3. An entertainment device according to claim 2, in which the usage conditions stipulate which elements of the supplementary data file may be used by the entertainment device and under what conditions.

4. An entertainment device according to claim 2, in which the supplementary data file comprises:
  i. an instruction script governing new behaviour that is available to an identified owner of the data file; and
  ii. an instruction script governing new behaviour that is available to other users.

5. An entertainment device according to claim 2 in which the usage conditions include one or more limitations selected from a list consisting of:
  i. limiting use by a non-owner to a specified period;
  ii. limiting use by a non-owner to a specific number of on-line sessions; and
  iii. limiting use by a non-owner to only while the remote entertainment device of the original user associated with the mod is still connected to the virtual environment.

6. An entertainment device according to claim 1 in which the networked device is another entertainment device of the virtual environment that is connected to the entertainment device in a peer-to-peer configuration.

7. An entertainment device according to claim 1 in which the networked device is a server hosting the on-line virtual environment.

8. An on-line system comprising a server and a plurality of entertainment devices, in which the server comprises:

a network communications arrangement operable to receive data representative of actions of each user within an on-line virtual environment, and to transmit data representative of the actions of each other user to a remote entertainment device of each user within the on-line virtual environment;

the network communications arrangement being operable to receive from a remote entertainment device joining the on-line virtual environment data indicative of a supplementary data file required to represent an avatar of the user of the joining remote entertainment device within the online virtual environment;

a data file obtainer operable to obtain an indicated supplementary data file, and in which:

the network communications arrangement is operable to transmit corresponding supplementary data files to the remote entertainment devices of one or more users already within the on-line virtual environment other than the joining remote entertainment device, and in which each entertainment device comprises:

a display generator arranged to generate for display a representation of an on-line virtual environment, that on-line virtual environment being able to host interactions between an avatar of a user of the entertainment device and avatars of other users of one or more remote entertainment devices, the entertainment device and the one or more remote entertainment devices holding in common code to represent the on-line virtual environment;

a network communications arrangement operable to receive data representative of the interactions of the other users within the on-line virtual environment, and operable to receive data indicative of any supplementary data files comprising a modification to be applied to the displayed on-line virtual environment, to represent the avatar of one or more remote entertainment devices of users who join the on-line virtual environment, said supplementary data files comprising one or more graphics textures;

a data file searcher operable to search the entertainment device for any supplementary data files indicated by the received data;

a data file acquisition arrangement operable to acquire, from a networked device, a copy of a supplementary data file indicated by the received data that was not found on the entertainment device; and a data file integrator operable to incorporate relevant elements of the or each supplementary data file into the representation of the on-line virtual environment.

9. A method of modifying an online environment comprising the steps of:

connecting an entertainment device to an on-line virtual environment able to host interactions between an avatar of a user of the entertainment device and avatars of other users of one or more remote entertainment devices, and generating for display a representation of that environment, the entertainment device and the one or more remote entertainment devices holding in common code to represent the on-line virtual environment;

receiving, at the entertainment device, data indicative of any supplementary data files to represent within the on-line virtual environment avatars of users of one or more remote entertainment devices joining the same on-line virtual environment, said supplementary data files comprising one or more graphics textures;

searching the entertainment device for any supplementary data files indicated by the received data;

acquiring, from a networked device, a copy of a supplementary data file indicated by the received data if not found on the entertainment device; and incorporating relevant elements of the or each supplementary data file into the representation of the on-line virtual environment.

10. A method according to claim 9 comprising the step of determining from usage conditions associated with the supplementary data file which elements of the supplementary data file may be used by the entertainment device and under what conditions.

11. A non-transitory computer-readable storage medium storing computer readable instructions that, when executed by a computer, cause the computer to carry out a method of modifying an online environment comprising the steps of:

connecting an entertainment device to an on-line virtual environment able to host interactions between an avatar of a user of the entertainment device and avatars of other users of one or more remote entertainment devices, and generating for display a representation of that environment, the entertainment device and the one or more remote entertainment devices holding in common code to represent the on-line virtual environment;

receiving, at the entertainment device, data indicative of any supplementary data files to represent within the on-line virtual environment avatars of users of one or more remote entertainment devices joining the same on-line virtual environment, said supplementary data files comprising one or more graphics textures;

searching the entertainment device for any supplementary data files indicated by the received data;

acquiring, from a networked device, a copy of a supplementary data file indicated by the received data if not found on the entertainment device; and incorporating relevant elements of the or each supplementary data file into the representation of the on-line virtual environment.

* * * * *